United States Patent

Mangalam et al.

[11] Patent Number: 6,134,959
[45] Date of Patent: Oct. 24, 2000

[54] METHOD FOR DETECTING FLOW BIFURCATION DURING SONIC FLOW CONDITIONS

[75] Inventors: Sivaramakrishman M. Mangalam, Williamsburg; Garimella Ramakrishna Sarma, Newport News, both of Va.

[73] Assignee: Tao of Systems Integration, Inc., Williamsburg, Va.

[21] Appl. No.: 09/135,282

[22] Filed: Aug. 17, 1998

[51] Int. Cl.[7] .............................. G01F 13/00; G01P 5/00
[52] U.S. Cl. ........................................................ 73/170.12
[58] Field of Search ........................... 73/204.15, 204.16, 73/204.19, 147, 118.2, 178 R, 170.12, 1.16, 1.37

[56] References Cited

U.S. PATENT DOCUMENTS

| | | | |
|---|---|---|---|
| 2,583,561 | 1/1952 | General et al. | 73/204 |
| 3,246,515 | 4/1966 | Martino et al. | 73/204 |
| 3,464,269 | 9/1969 | Froger | 73/204 |
| 4,217,910 | 8/1980 | Khalil | 128/670 |
| 4,357,829 | 11/1982 | Kraus et al. | 73/204 |
| 4,672,847 | 6/1987 | Uchiyama et al. | 73/204 |
| 4,727,751 | 3/1988 | Holmes et al. | 73/147 |
| 4,831,876 | 5/1989 | Porth et al. | 73/204.16 |
| 4,833,912 | 5/1989 | Ohta et al. | 73/118.2 |
| 5,074,147 | 12/1991 | Sarma | 73/204.15 |
| 5,209,111 | 5/1993 | Agarwal et al. | 73/147 |

*Primary Examiner*—William Oen
*Attorney, Agent, or Firm*—Kaufman & Canoles

[57] ABSTRACT

A method is provided for detecting flow bifurcation during sonic flow conditions to identify shock location. The method includes setting the initial test conditions, either by setting up an altitude and airspeed in a test aircraft or by setting up an initial flow condition in a wind tunnel. The method for detecting flow bifurcation during sonic flow conditions to identify shock location requires an array of hot films be attached to an aerodynamic surface where shock is expected to impinge. These hot-films are connected to a bank of Constant Voltage Anemometers (CVA), one CVA for each hot film. After reaching the altitude where the testing is to be done, (or attaining the reference condition in a wind tunnel), a pilot initiates an auto-initializing sequence before the onset of a shock, typically at a low speed condition. This sets the current in each sensor to identical values and sets the sensor temperature above ambient temperature of the reference conditions. An auto zero sequence is then initiated to provide zero output current and create a reference point before the onset of the shock. A shock is then generated by linear acceleration of by angle of attack changes. After generating the shock, voltage output of the hot film sensors and the temperatures of the hot films are evaluated. The location of the shock is shown by the hot-film having the highest temperature.

1 Claim, 9 Drawing Sheets

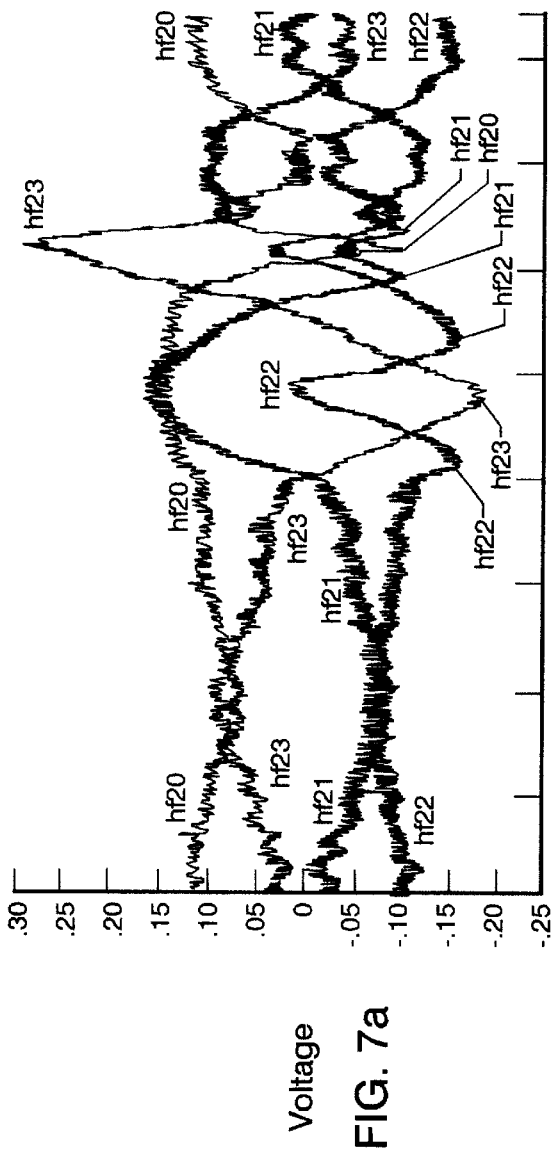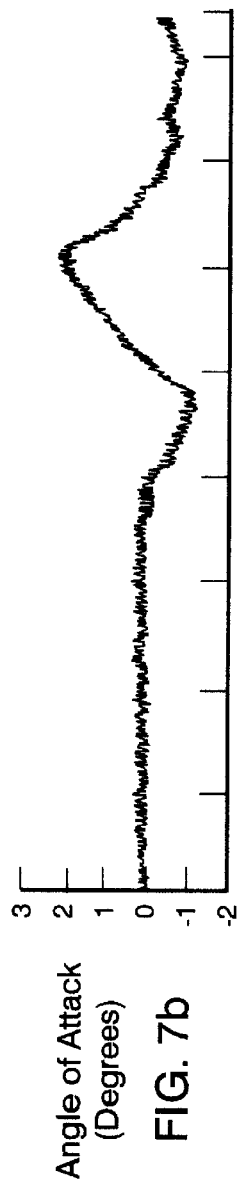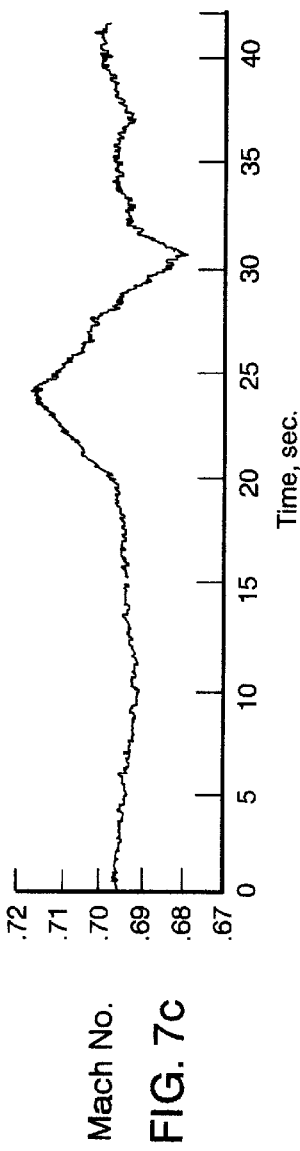
FIG. 7a — Voltage
FIG. 7b — Angle of Attack (Degrees)
FIG. 7c — Mach No.

METHOD FOR DETECTING FLOW BIFURCATION DURING SONIC FLOW CONDITIONS

FIELD OF THE INVENTION

The invention is related to the airflow measuring instrument systems and in particular to anemometers using hot-film arrays.

BACKGROUND OF THE INVENTION

Traditionally, pressure sensors have been used to determine the shock location both in wind tunnel flows and on aircraft flow surfaces. The use of pressure sensors requires drilling the flow surface with multiple small holes (to form a static port) and installing subsurface tubing and plumbing. For aircraft installations, the breach of the surface by drilling can weaken the structure. Additionally, some locations, such as along the inner surface of a jet engine inlet, have only minimal room for plumbing. Inlet shock study and control require good spatial resolution for shock sensing which cannot be achieved using current pressure sensor system. On both external airflow surfaces, wings, empennage, etc, and on internal flow surfaces, such as jet engine inlets, it is often necessary to detect other flow conditions, in addition to shock location, in order to properly control the flow surface. These flow conditions include boundary layer conditions such as turbulence, flow separation, and flow reattachment locations. What is needed is a sensor system which can be located on an aerodynamic surface without breaching the structural integrity of the surface, which requires a minimum of under surface plumbing, which provides a high degree of spatial resolution and a high dynamic response, and at the same time can detect boundary layer conditions and shock location.

SUMMARY OF THE INVENTION

Accordingly, it is an object of the invention to provide an airflow sensing instrument system and method for detecting flow bifurcation having no subsurface plumbing.

It is another object of the invention to provide an airflow sensing instrument system and method for detecting flow bifurcation with a very high dynamic response.

It is yet another object of the invention to provide an airflow sensing instrument system and method for detecting flow bifurcation with high spatial resolution.

It is still another object of the invention to provide an airflow sensing instrument system and method for detecting flow bifurcation which can simultaneously detect the boundary layer conditions.

It is a further object of the invention to provide an airflow sensing instrument system and method for detecting flow bifurcation capable of identifying the geometric location of the incidence shock on an aircraft wing, engine inlet, or any other body in terms of the body dimensions.

The airflow sensing instrument system and method for detecting flow bifurcation comprises arrays of hot-films attached to an aerodynamic surface where a shock is expected to impinge. These hot-films are connected to a bank of Constant Voltage Anemometers (CVA), one CVA for each hot-film.

After reaching the altitude where the testing is to be done, (or attaining the reference condition in the wind tunnel), the pilot initiates an auto-initializing sequence before the onset of a shock, typically at a low speed condition. The CVAs have been designed so that all the hot-films have identical current flow. The initial current is set so that the temperature of the hot-films is raised above the ambient temperature on the surface. The change in output voltage from the CVAs, after the initial current setting, is caused by heat transfer from the hot-film surfaces during shock and boundary layer flows over the hot-films.

By setting the initial current through the hot-films to be identical, the sensitivity coefficient is also made identical in all the channels of the CVA. An auto zero sequence is then initiated at this reference point before the onset of the shock. The auto zero unit matches and subtracts any output voltages from the CVA that exist at the reference condition. By this sequence, all the outputs from the channels are zero at the initial reference condition before the onset of the shock. Thereafter, with the shock incident on the hot-film array, the temperature of the hot-film in the array changes from the reference condition. The location of the shock is shown by the hot-film having the highest temperature.

BRIEF DESCRIPTION OF THE DRAWINGS

The foregoing objects and other advantages of the present invention will be more fully understood from the following detailed description and reference to the appended drawings wherein:

FIG. 7a is a graph showing hot-film voltage outputs for flight at Mach 0.7 with an angle-of-attack sweep.

FIG. 7b is a graph showing the changes in angle-of-attack corresponding to the hot-film voltages of FIG. 7a.

FIG. 7c is a graph showing the local Mach number corresponding to the angle-of-attack changes in FIG. 7b.

DETAILED DESCRIPTION OF THE INVENTION

Figure 1:
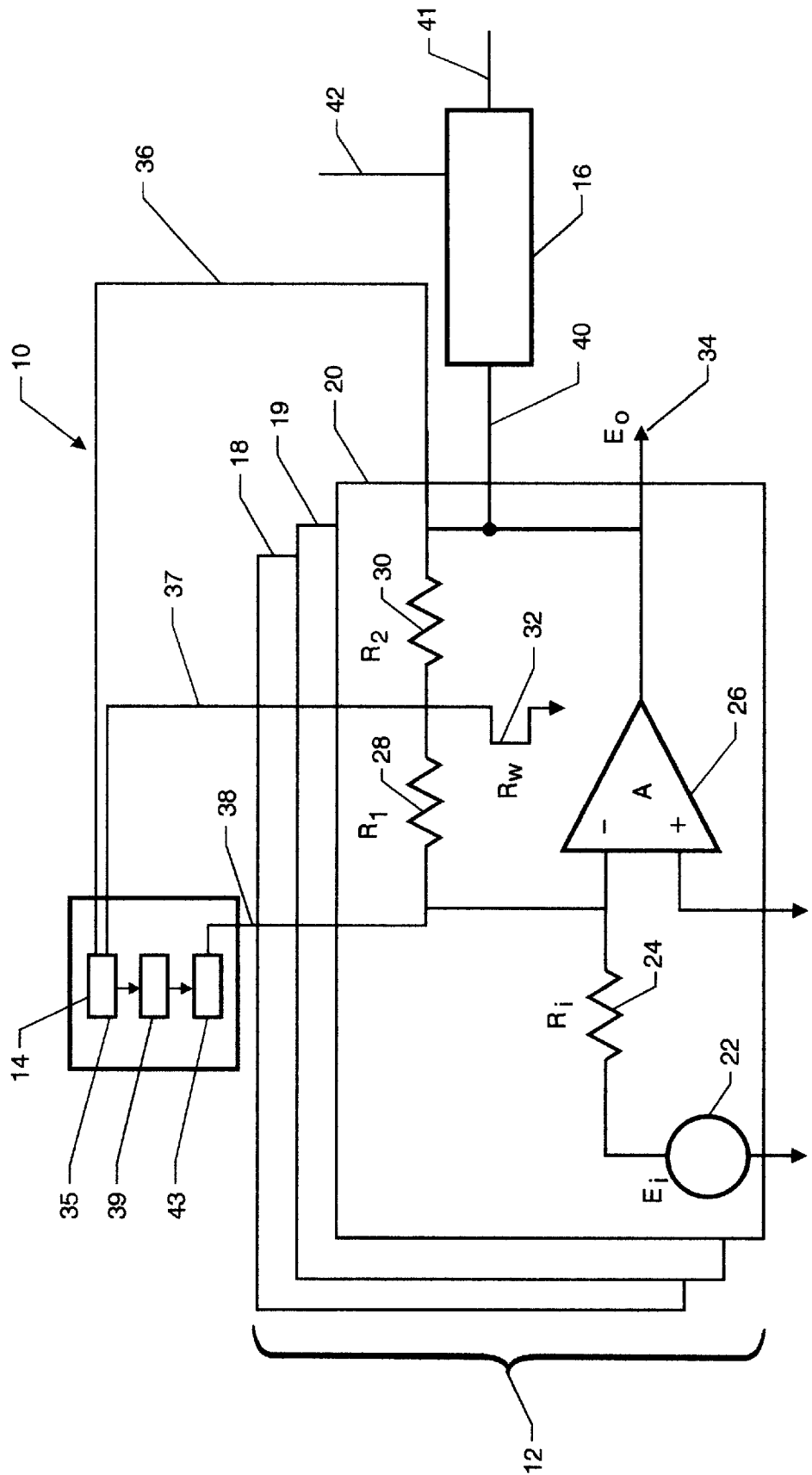
FIG. 1 is a schematic of the circuitry of the airflow sensing instrument system and method for detecting flow bifurcation.

Referring now to FIG. 1, a schematic of the overall airflow sensing instrument system, designated generally by the reference numeral 10, is shown with its major components. The airflow sensing instrument system 10 comprises a plurality of constant voltage anemometers (CVA's) forming a CVA bank 12 having one CVA for each hot-film. Individual CVA's 18, 19, and 20 represent the plurality of CVA's, but it is understood that a larger number of anemometers is required and that the three shown are representative only. The auto-initializing module 14 is connected to each CVA and, upon manual initiation, sets the initial CVA current flow so that all sensors have identical current flows. A second module, auto-zero module 16, sets the output of all channels to zero at a particular flight condition prior to flow measurements. These two auto-setting modules control the basic CVA circuit 20 so that the set-up for flow measurement and shock detecting are automatic. The basic circuit 20 receives an input voltage 22 through an initial impedance 24 which is connected to the negative feedback loop of the anemometer. This loop comprises an impedance 28 and an impedance 30 connected in series forming a junction to which the hot-film or hot-wire sensor 32 is connected. She auto-initializing module 14 is connected across impedance 24 and impedance 30 in order to insure that each CVA has the same current flow across the hot-film sensor 32. The operational amplifier 26 completes the feedback loop of the CVA. The initial current is set so that the temperature of the hot-film is raised above the ambient temperature on the surface. The output voltage change from the CVAs, after this setting of the initial current, is due to the heat transfer from the hot-film surfaces due to shock and boundary layer flows over the hot-films. This change in output voltage from the CVA is given by the equation:

$$\Delta V_0 = -R_2 I_s \left[ \frac{\alpha \Delta T}{1 + \alpha \Delta T} \right]$$

In the above equation $\Delta V_0$ is the output voltage change in the CVA due to a change of $\Delta T$ in the hot-film temperature from convection due to flow over the hot-films. For a given design, the product $R_2 I_s$ will be the sensitivity coefficient of the CVA and will be identical in all channels. $\alpha$ is the temperature coefficient of resistance of the hot-film material. For a hot-film array made cut of the same sheet, $\alpha$ will be very close to each other in all of the hot-films.

OPERATION OF THE INVENTION

During the operation, the auto-initializing module 14, is a mechanism for automatically setting the current in the hot film sensors to raise their temperatures above the ambient. The current in the hot-films is computed based on the voltage levels sensed with leads 36 and 37 and the current is adjusted by injecting through lead 38. The internal mechanism of the auto-initializing module 14 includes an electrical current estimator 35, which receives the input of leads 36 and lead 37 as depicted. The current estimator, 35, provides an output to the comparator 39, which sets the current required for the auto-initializing process. The output of the current set value is received by the current pump, 43, which is connected to lead 38 which, in turn, is connected to the negative feedback loop of the anemometer. Auto-initializing is done for each hot-film and its associated CVA.

Module 16 is an auto zero device that subtracts, in response to a command 42, the voltage $E_0$ itself to produce almost zero output voltage at 41. After setting the current through the hot-films to be identical, thereby making the sensitivity coefficient identical in all the channels of the CVA, an auto zero sequence is also initiated at this reference point before the onset of the shock. This configured auto zero unit will match and subtract the output voltages from the CVA that exist at the reference condition such that all the outputs from the channels are zero at the initial reference condition before the onset of the shock.

Following the auto-zero setup, with the shock incident on the hot-film array, the temperature of the hot-films change from the reference condition, with the hot-film located at the shock impingement point being the hottest of them all.

Figure 2:
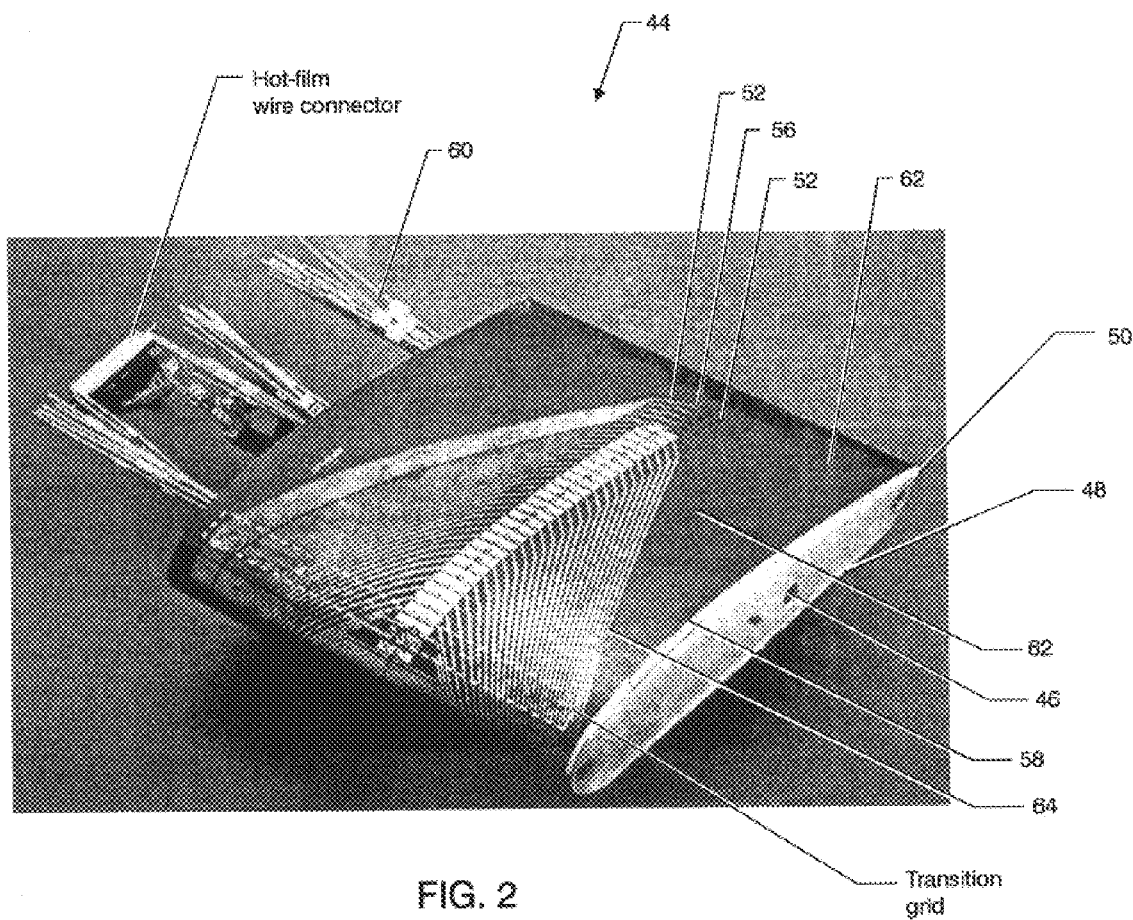
FIG. 2 is a perspective view of the hot-film arrays and connector.

Referring now to FIG. 2, an instrumented airfoil system configured as an aluminum test article is shown. The aluminum test article 44 comprises an unswept, low-aspect-ratio wing 46 with a modified NACA 0021 airfoil section. The unswept wing 46 has a span of eight and one-half inches and a chord of ten inches. The lower airfoil surface 48 is flattened and the trailing edge 50 is blunted to allow internal installation of pressure ports 52 and the routing of electrical leads 54 from the surface-mounted hot-films 56. Sixty-two flush pressure ports 52 were installed on the upper surface 58.

Figure 3:
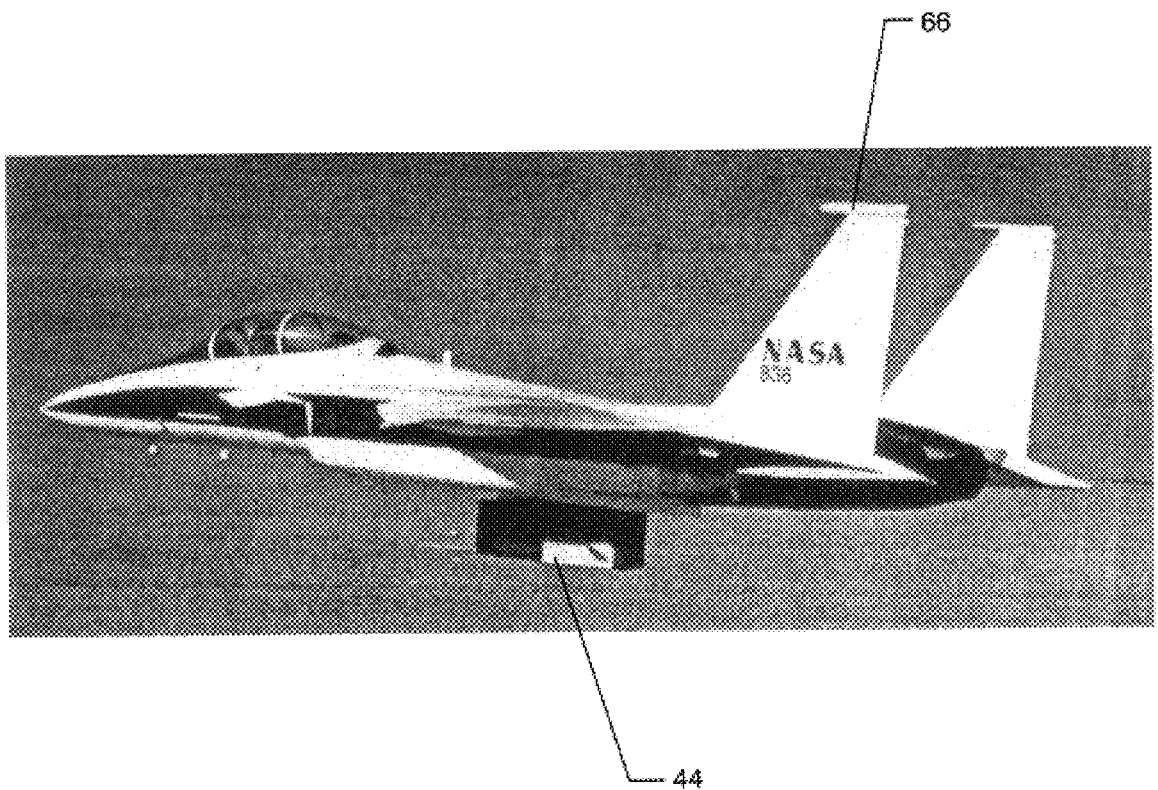
FIG. 3 is a perspective view of the shock locating instrument system mounted on a McDonnell-Douglas F-15 fighter.

Stainless steel tubing 60 with internal diameter of 0.031 in. was used to plumb the pressure ports 52. The pressure tubing 60 was routed into the test article and connected to flexible tubing (0.055 in. internal diameter) once inside the test article. A polyimide sheet 62 containing the hot-films 56 and associated wire leads 64 covered the entire upper surface 58 of the airfoil. Pressure port holes were drilled through this sheet. FIG. 3 shows the test article 44 mounted on the lower fuselage of a McDonnell Douglas F-15 fighter 66. Flight conditions and test results are depicted in the following graphs.

Figure 4A:
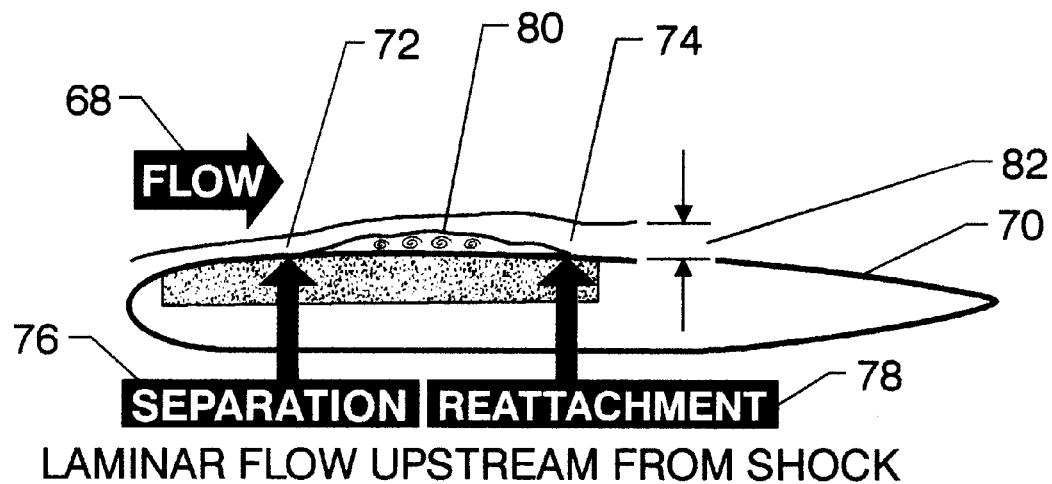
FIG. 4a is a sketch of an airfoil with a laminar boundary layer.
Figure 4B:
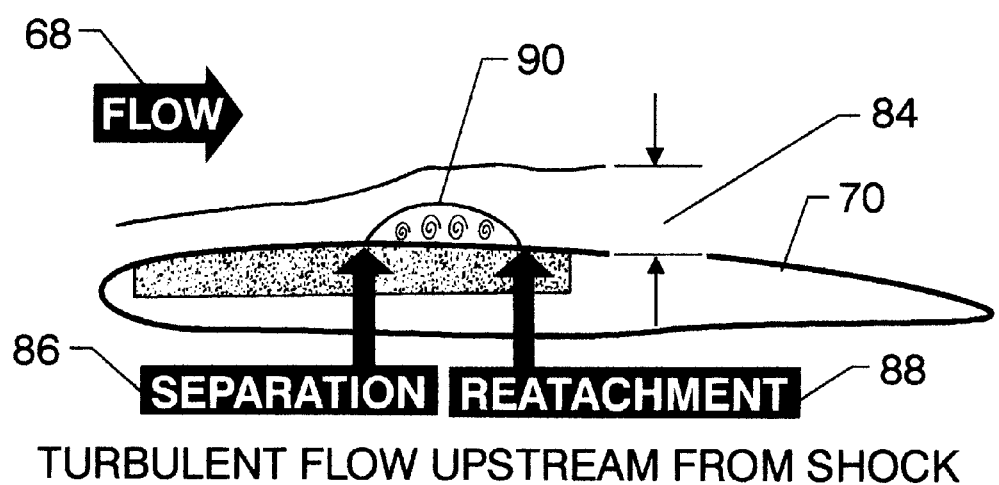
FIG. 4b is a sketch of an airfoil with a turbulent boundary layer.
Figure 5A:
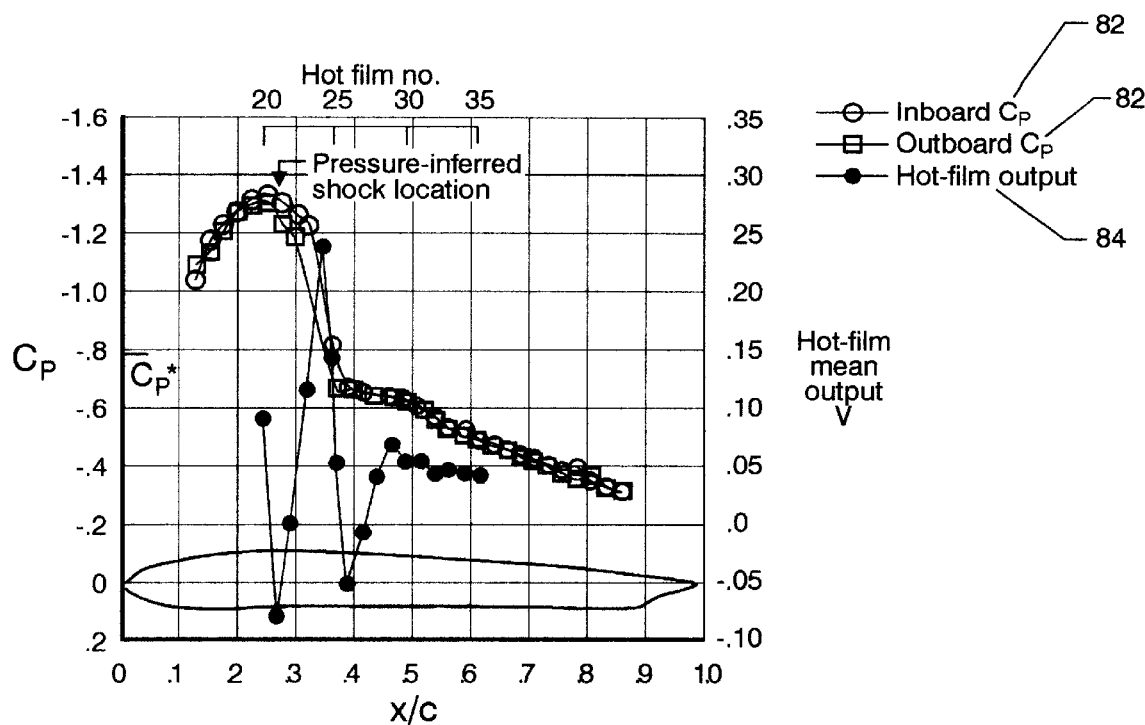
FIG. 5a is a graph showing pressure and hot-film voltages for a laminar boundary layer at Mach 0.7.
Figure 5B:
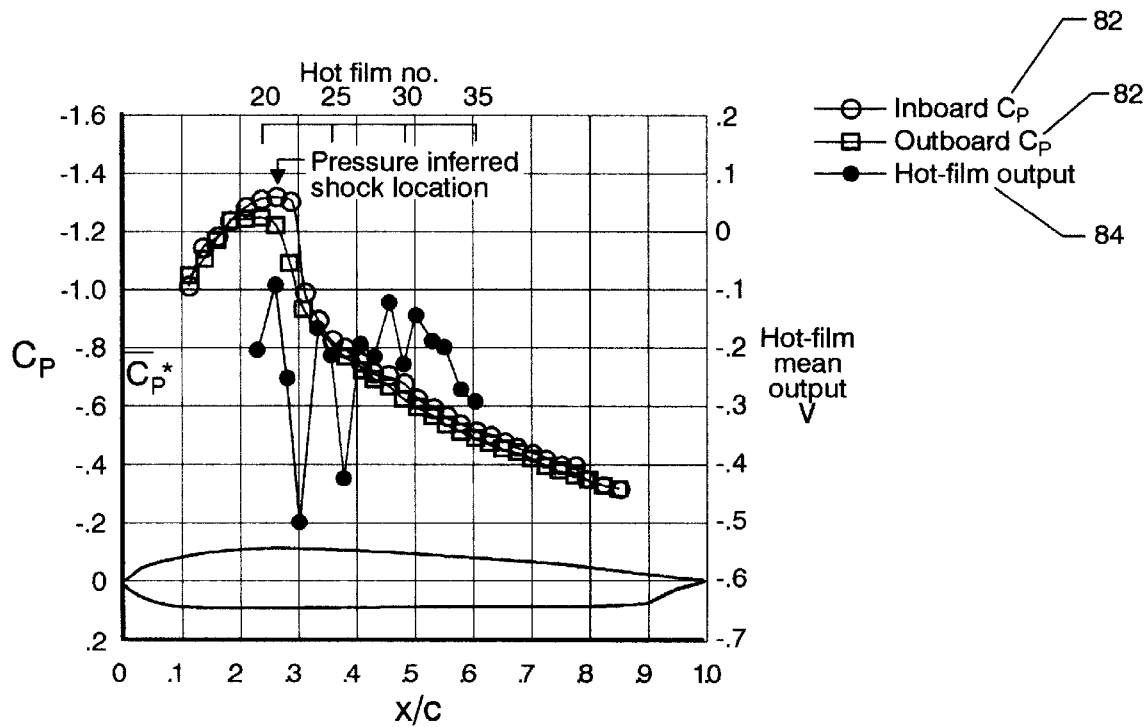
FIG. 5b is a graph showing pressure and hot-film voltages for a turbulent boundary layer at Mach 0.7.
Figure 6A:
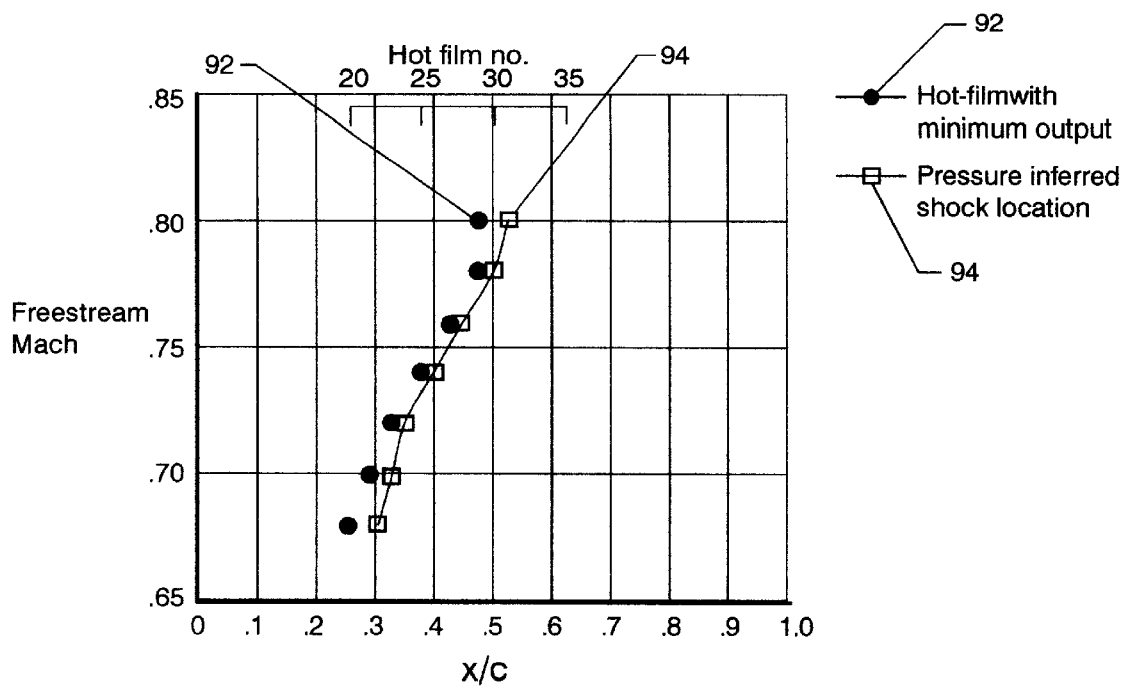
FIG. 6a is a graph showing a comparison of hot-film minimum voltages with pressure-inferred shock location for a laminar boundary layer.
Figure 6B:
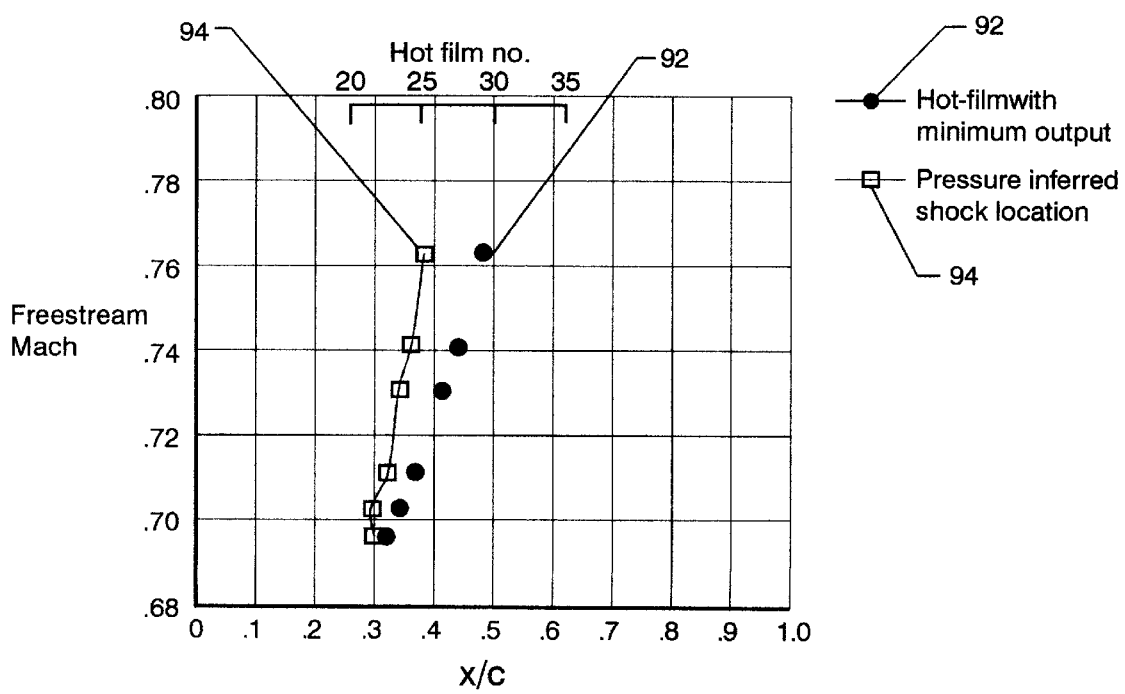
FIG. 6b is a graph showing a comparison of hot-film minimum voltages with pressure-inferred shock location for a turbulent boundary layer.

Referring to FIGS. 4a and 4b, a graphical representation of flow 68 with laminar flow, FIG. 4a, and turbulent flow, FIG. 4b is shown. Typically, the adverse pressure gradient induced by the shock causes local separation of the boundary-layer flow over the airfoil section 70. A typical structure of the shock-boundary-layer interaction is shown between the lambda shock forward edge 72 and the rearward edge 74. One of the important effects of the shock in transonic flows is the presence of flow separation at the foot of the lambda-shock. The extent and the subsequent behavior of the shock-induced separated flow region is dictated by the shock strength, as well as other flow characteristics, such as the state of the boundary layer at the shock location. For example, FIG. 4a with laminar flow shows a relatively thin boundary layer 82, while FIG. 4b with a turbulent flow shows a relatively thick boundary layer 84. The distance between the flow separation 86 and the reattachment 88 is shortened with a resulting shorter but thicker separation bubble 90. These separation effects have severe impacts on the aircraft performance and safety Successful flight tests were conducted using the NASA Dryden Flight Research Center's F-15B Flight Test Fixture (FTF) to detect transonic shock on a modified NACA0021 airfoil section instrumented with an array of micro-thin, multi-element surface hot-film sensors. These hot-films were operated by an automated 16-channel constant voltage anemometer instrumentation system. The airfoil model was also instrumented with upper surface pressure orifices. The hot-film outputs were correlated to the shock location estimates inferred from the pressure measurements. Both laminar and tripped boundary layers were investigated. Flight tests were conducted at an altitude of 20,000 ft. and Mach numbers 0.68 through 0.8. Tests are conducted under stabilized angle-of-attack alpha as well as under variable angle-of-attack and Mach number conditions. The flight Reynolds number range based on airfoil chord for the stabilized flight conditions was between 1.8 and 2.5 million. The boundary layer upstream of the shock at these flight conditions was laminar. Grains of 0.02-in. maximum diameter grit were used in one flight at Mach 0.70 to trip the flow. The presence of the grit made a significant effect on both the pressure and hot-film measurements. As examples of the output of the invention, the pressure distribution 82 and hot-film voltage outputs 84 are plotted for data at Mach 0.70, for laminar (FIG. 5a), and tripped (FIG. 5b) boundary layers. For comparison, the chordwise distribution of signal RMS (Root Mean Square) voltages 92 and the pressure distribution 94 are shown in FIGS. 6a and 6b, (for the laminar flow, FIG. 6a, and tripped boundary layer, FIG. 6b). The effect of trip clearly shows large effects reversing the plot positions of the RMS signal 92 and the pressure signal 94.

The shock location is inferred from the pressure measurements to be where the shock-induced rapid pressure rise begins. For the laminar boundary layer case (FIG. 5a), the rapid pressure rise begins approximately at x/c=0.325 (near hot-film sensor 23), whereas for the tripped boundary-layer case shown in FIG. 5b the rapid pressure rise begins at approximately x/c=0.275 (sensor 21). FIGS. 5a and 5b also show mean voltage outputs of hot-film sensors obtained by averaging 1 second of stabilized flight data.

The voltage output from the hot-film sensor operated by CVA is a direct indication of the heat transfer from the sensor to the fluid or vice-versa. In subsonic flows, the least heat transfer by convection occurs in the neighborhood of the various flow bifurcation regions such as the leading-edge stagnation, flow separation and flow reattachment regions. At these critical locations the hot-film sensor is a local 'hot spot' since relatively less heat is transferred by convection to the fluid from this sensor. Hence the sensors located at the 'hot spots' have a relatively higher resistance compared to the neighboring sensors and this condition translates to a minimum current through this sensor for a given constant voltage across the sensor. Thus, the output from the 'hot spot' sensor will be a minimum. In the presence of shock, the sensor actually gets heated beyond the initial setting and, hence, the output voltage drops below the auto-zero reference level.

The voltage trends from each sensor during a flight maneuver also convey significant information on the flow characteristics. It is well known that the heat transfer rate and surface shear stress decrease towards the bifurcation region and increase away from it. Thus, during a flight maneuver, as the 'hot-spot' (e.g., shock) approaches a sensor, the output voltage from that sensor decreases due to a decrease in heat transfer. Similarly, as the 'hot spot' moves away from a sensor, its output voltage tends to increase because of an increase in heat transfer. Thus, if two adjacent sensors show opposing output-voltage trends, then it is clear that a 'hot spot' is situated somewhere in between them during that period. We shall use these observations in the following interpretation of the flight test data.

Referring now to FIGS. 7a, 7b and 7c, for the laminar boundary-layer case (as shown in FIG. 5a), the minimum output voltage occurs at x/c=0.275 (not-film sensor hf21 shown in FIG. 7a) which is upstream of the rapid pressure rise (x/c=0.325) and aft of the minimum pressure location (x/c=0.25). For the tripped boundary-layer case shown in FIG. 5b, the minimum voltage output occurs at x/c=0.275 (hf23) which is aft of the rapid pressure rise. Analysis of pressure and hot-film measurements at other Mach numbers showed similar trends. Locations of minimum mean voltages from hot-film sensors for the laminar boundary layer cases are correlated as a function of Mach number in FIGS. 7a and 7c. At all Mach numbers, the location of the minimum mean-voltage hot-film sensor is slightly forward of the pressure inferred shock location.

Although stabilized flights were carried out only at Mach 0.70 for the tripped boundary layer case, data were obtained during a level acceleration maneuver. The acceleration was approximately 3 kn/sec. FIG. 7a shows the Mach number at which these hot-film sensors produced the minimum value of output during acceleration. FIG. 7a also shows the pressure-inferred shock location. At all Mach numbers, the hot film with minimum output voltage occurs aft of the pressure inferred shock location. This trend was also seen during a level deceleration maneuver.

Figure 8:
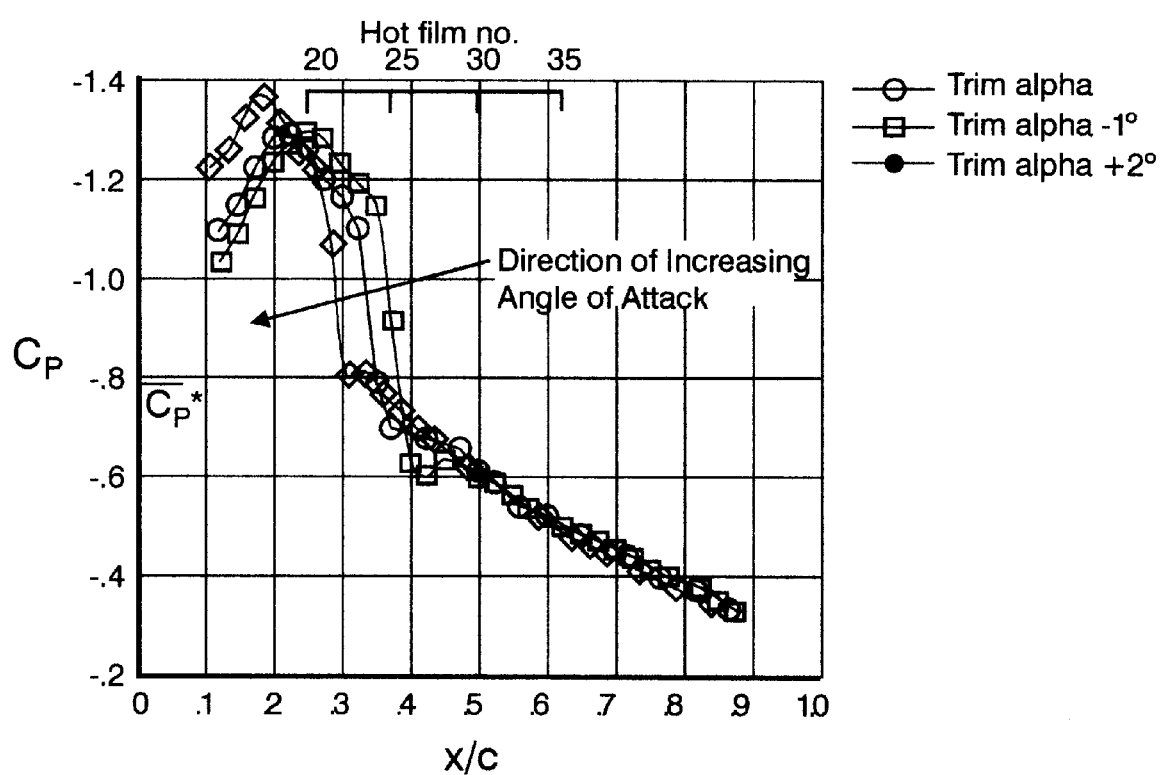
FIG. 8 is a graph of the airfoil pressure distributions during an angle-of-attack sweep.

Angle-of-attack sweeps were made to demonstrate the ability to track the shock location during a dynamic maneuver. Sweeps of approximately ±2° were made at various Mach numbers. FIG. 8 shows a time-history of a quasi-steady-state test point followed by an angle-of-attack sweep around Mach 0.70. For this case a laminar boundary layer was present upstream of the shock.

During the first 20 seconds of the maneuver, the angle-of-attack is held constant while the Mach number changes slightly. The angle-of-attack sweep is shown in the last 20 seconds. For simplicity, only four hot-film outputs in the neighborhood of the shock are shown.

For the most part, the sensor hf22 has the minimum output for the first 20 sec. of the maneuver. As the angle-of-attack decreased, the shock location shifted to hf23 (20 sec. <t<25 sec.) and as the aircraft pulled up the shock location returns to hf22, followed by hf21 and reaches the sensor hf20 at the highest angle-of-attack. Pushing over to trim angle-of-attack, the shock location reverts to hf22, passing through the other sensors is the reverse order. The movement of the minimum voltage output is consistent with the movement of the shock shown in FIG. 8 which clearly shows the pressure rise moving aft curing the push over, moving forward during the pull up, and then returning to the original position.

The hot-film outputs are highly sensitive to Mach number variations (shown in FIG. 7c) during the first 20 seconds of the time history (FIG. 7a). Hot-films hf20 and hf21 are in phase with Mach number (i.e., decreasing in output as Mach number decreases and increasing in output as Mach number increases). Hot-films hf22 and hf23 show just the opposite response and are approximately 180° out of phase with Mach number and are therefore out of phase also with hot-films hf20 and hf21. The please reversal between hot-films hf21 and hf22 can also be an indicator of the shock location. Phase reversal about the hot film with the minimum output was observed at all Mach numbers tested.

The time trace hf22 increases initially from t=0 to t=10 sec. and at the same time the output from the neighboring sensor hf21 decreases. As described earlier, this situation shows that the 'hot spot' (shock) is moving away from hf22 and moves towards hf21. Actually they cross each other for a short time around t=10 sec. indicating that the shock location was at or closer to the sensor hf21 for the given flight conditions at t=10 sec. The respective sensor output voltages again diverge beyond this time, with hf21 increasing in magnitude while hf22 decreases, indicating that the shock has moved farther away from hot-film sensor 21 location. The hot-film sensor hf22 with minimum output voltage is still located closest to the shock. At about t=20 sec., hf22 reaches its minimum and begins to increase. We can conclude that at this flight condition the shock was located exactly at the hot-film sensor hf22. As the angle-of-attack (shown in FIG. 7b) is further reduced we observe that output voltage from hf23 starts decreasing rapidly and crosses hf22 at about t=22 sec. and beyond this point the shock is located closer to hf23. In the meanwhile hf21 has continued to increase rapidly and even goes positive showing that it has entered a more highly convective region and is relatively cooled by the boundary-layer flow. The sensor hf23 reaches its own minimum at approximately t=24 sec. indicating that the shock was located at hf23 at the given flight conditions (low alpha, high Mach number). Every cross-over point indicates that the shock is moving away from sensor with increasing voltage and moving towards; the sensor with decreasing voltage, and at the cross-over point the shock is located between them. The rest of the figure can be similarly explained. Hot film hf20 remained practically dormant for the most part of this flight dramatically dropped in voltage around t=30 sec., when the aircraft angle-of-attack reached its maximum value and the Mach number approached its minimum. Also, for the entire duration of this maneuver hot-films 21 and 23 were basically out of phase with each other indicating that the shock was located between them during the entire period. Another interesting feature of the test results is that for 15 sec.<t<35 sec. the signal from hf22 exhibits a frequency that is approximately twice that of the other hot-films during the angle-of-attack sweep indicating that the shock oscillates around this sensor during this maneuver. Similar double frequency is observed in hf21 near the highest angle-of-attack conditions (t≈30-sec.). Another important observation that is consistent with Earlier studies is the relative low amplitude fluctuation of signals from the sensor located at the mean-shock position. For example, for 27 sec.<t<35 sec., when the angle-of-attack reaches its maximum and starts to decrease the mean shock position oscillates about the sensor hf21. We can observe that the amplitude of fluctuation over this period is significantly lower than the amplitude of signals for neighboring sensors. Similarly, for the entire alpha sweep, the sensor hf22 where the mean shock was located, exhibits a low-amplitude, double-frequency characteristic.

As the angle-of-attack and the Mach number returned to their trim values (t>35 sec.), the sensor outputs also returned to their initial values showing that the approach used in these flight tests was very effective and repeatable.

These flight test results show that both minimum mean voltage and phase reversal signatures are potential indicators of the shock location. At some transonic Mach numbers, two distinct minimums occur in the hot-film outputs. This second minimum is associated with the second leg of a lambda shock. In terms of the surface characteristics, the front leg of the lambda shock is associated with flow separation while reattachment occurs near the rear leg.

There are two concurrent effects present in the shock region: (1) the sensor is heated by the presence of the shock and (2) heat is transferred from the sensor by convection. Less heat is taken away from the sensor which is located at a flow bifurcation region such as flow separation and flow reattachment where the convective heat transfer is a minimum. Hence, we are observing the combined effect of these two independent phenomena. The presence of a negative voltage indicates that the heating due to the shock is greater than heat transfer by convection and the minimum voltage indicates the presence of a flow bifurcation point. The phase reversal signature, double frequency, and low amplitude signals from the sensor at the mean shock location indicate that the flow oscillates about the bifurcation point.

Figure 9:
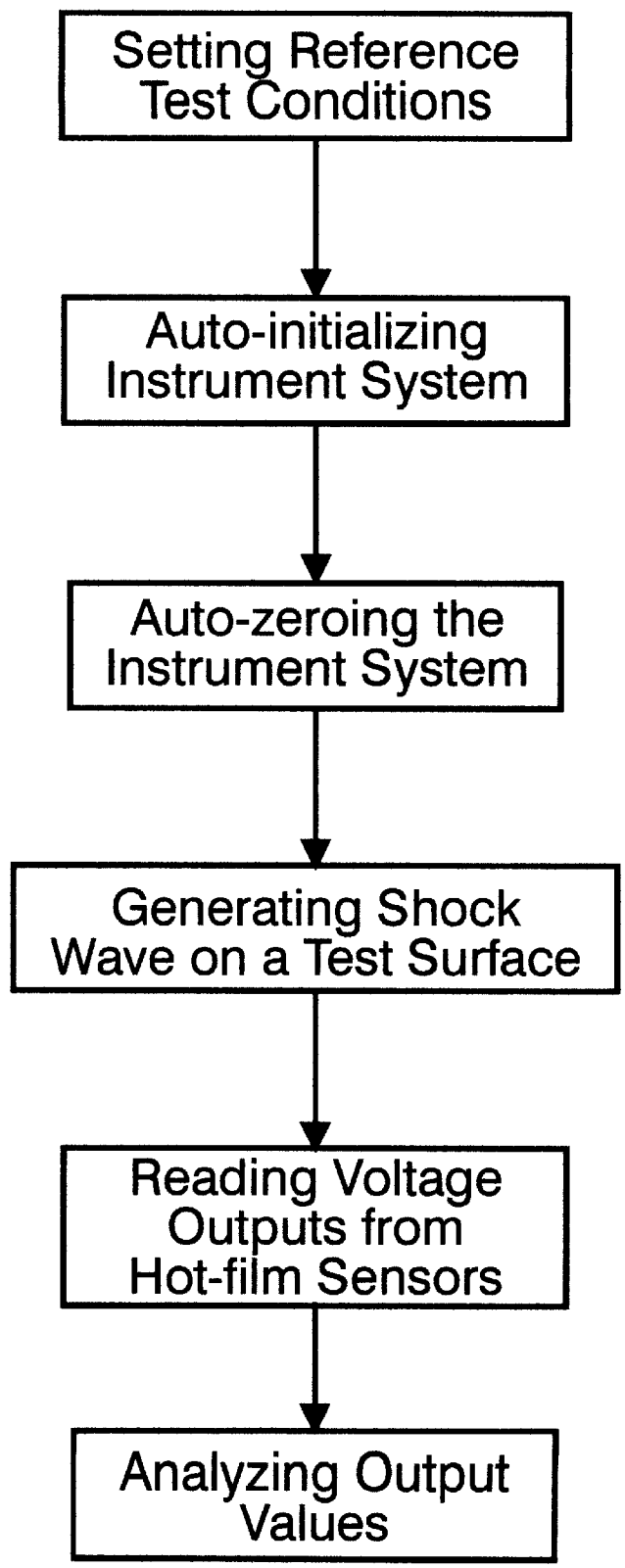
FIG. 9 is a flow chart showing the sequence of steps for locating a flow bifurcation.

Referring now to FIG. 9, the overall method of the present invention is depicted. The method includes setting the initial test conditions, either by setting up an altitude and airspeed in a test aircraft or by setting up an initial flow condition in a wind tunnel. Thereafter, the flow-sensing instrument is initialized using the auto-initializing sequence, which sets the current in each sensor to identical values and sets the sensor temperature above the ambient temperature of the reference conditions. Thereafter, the instrument system is auto-zeroed using the module to provide zero output current. After auto initializing and auto zeroing, a shock is generated on the sensor surface. A shock may be generated by linear acceleration or by angle-of-attack changes. After generating the shock, the voltage output of the sensor are read and the results analyzed to determine shock location. As described earlier, the shock is located at the sensor having the highest temperature.

The micro-thin hot-film sensor used in these tests consisted of an array of 45-nickel elements (1 mm long, 0.12 mm wide, and 0.25 $\mu$m thick) on a polyimide substrate. The sensor elements were attached to 13 $\mu$m thick, copper-coated nickel leads that were routed, as shown in FIG. 2, to the airfoil lower surface. The hot-film sensor spacing was designed to be identical with the spacing of the pressure ports. The sensor leads were soldered onto 33-gauge wires that were routed through a narrow slot on the lower surface into the airfoil. Coaxial cables connected these wires to a bank of CVAs inside the FTF. The 'cold' resistance of the sensor elements was 10 $\Omega$ on the ground and dropped to approximately 8.5 $\Omega$ at the flight test altitude, where the ambient temperature was approximately 11° F.

The CVA has been described in a number of recent publications. As the name implies, the sensor is maintained at a constant voltage as shown in the basic circuit. The voltage level maintained across the sensor determines the current through the sensor and is used for ohmic heating of the sensor. The thermal gradient between the heated sensor and the fluid medium results in heat transfer by convection. The changes in sensor temperature due to this heat transfer result in changes in sensor resistance, and the corresponding changes in sensor current are measured across a large resistor $R_2$.

The output voltage from the CVA is a measure of the convective heat transfer from the surface hot-films. Hence the output voltage is small in laminar boundary layers and high in turbulent boundary layers. The output voltage will also be small when the convective heat transfer and the corresponding shear stress is small as in flow bifurcation regions (leading-edge stagnation point, flow separation and flow reversal regions). In order to effectively detect these critical flow features, the CVA system is equipped with an auto-zero unit which creates a level initial (reference) voltage for all the sensors. The CVA system also incorporates features to automatically set identical desired initial current through all the sensors. Subsequently, the output voltage at any test condition is an indication of relative changes in heat transfer from the reference condition. The CVA instrumentation system, since it operates on a constant voltage basis, does not suffer from the adverse impact of EMI and RFI, cable length (capacitance) does not pose any operational problems (such as instability or oscillations), and has high sensitivity and large bandwidth.

The benefits and advantages of the invention are numerous. No subsurface plumbing is required other than electrical connections. The invention provides a shock locating instrument system with a very high dynamic response. In comparison, most pressure systems provide a very slow response typically providing only average pressures in oscillatory conditions. The invention allows high spatial resolution, whereas pressure installations are limited in how closely sensors can be located. Additionally, the invention can simultaneously detect the boundary layer conditions, such as, stagnation points, flow separation, flow reattachment, flow reversal and skin friction.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. A method for detecting airflow bifurcations during sonic flow conditions comprising the steps of:

setting reference test conditions at a velocity slower than shock formation velocity;

auto-initializing a hot-film sensor array to provide a sensor temperature above ambient temperature for every sensor;

auto-zeroing a hot-film sensor to provide zero output at the set reference conditions;

generating a shock wave incident to a hot-film sensor array;

reading voltage outputs from the hot-film sensor array; and analyzing the voltage output to identify shock location.

* * * * *